United States Patent [19]

Colquhoun et al.

[11] 4,070,526

[45] Jan. 24, 1978

[54] RADIATION-CURABLE COATING COMPOSITIONS COMPRISING MERCAPTOALKYL SILICONE AND VINYL MONOMER, METHOD OF COATING THEREWITH AND COATED ARTICLE

[75] Inventors: Joseph A. Colquhoun, Midland; Robert E. Kalinowski, Auburn, both of Mich.

[73] Assignee: Dow Corning Corporation, Midland, Mich.

[21] Appl. No.: 688,197

[22] Filed: May 20, 1976

[51] Int. Cl.$^2$ .............................................. B05D 3/06
[52] U.S. Cl. .............................. 428/537; 204/159.13; 260/46.5 E; 260/825; 260/827; 427/44; 427/54; 428/447
[58] Field of Search ............... 427/54, 44; 204/159.13, 204/159.15; 260/46.5 UA, 46.5 E, 825, 827; 428/447, 537

[56] References Cited

U.S. PATENT DOCUMENTS

| 3,328,482 | 6/1967 | Northrup et al. | 260/825 |
| 3,436,252 | 4/1969 | Nevroth | 260/827 |
| 3,532,729 | 10/1970 | Cekada et al. | 260/827 |
| 3,686,356 | 8/1972 | Saam | 260/825 |
| 3,726,710 | 4/1973 | Berger et al. | 427/12 |
| 3,770,687 | 11/1973 | Mestetsky | 260/827 |
| 3,816,282 | 6/1974 | Viventi | 260/46.5 UA |
| 3,873,499 | 3/1975 | Michael et al. | 260/46.5 UA |
| 3,923,923 | 12/1975 | Fiedler | 260/827 |

FOREIGN PATENT DOCUMENTS 1,200,476  7/1970  United Kingdom ........ 260/46.5 UA

Primary Examiner—John H. Newsome
Attorney, Agent, or Firm—George A. Grindahl

[57] ABSTRACT

Fluid compositions are disclosed which are useful as coatings on solid substrates. The compositions comprise a mercaptoalkyl-substituted polydiorganosiloxane fluid and a vinyl monomer. The compositions may further comprise a methylvinylpolysiloxane and/or a photosensitizing compound. The compositions, applied and cured on a substrate such as paper, provide improved release of adhesive materials.

18 Claims, No Drawings

RADIATION-CURABLE COATING COMPOSITIONS COMPRISING MERCAPTOALKYL SILICONE AND VINYL MONOMER, METHOD OF COATING THEREWITH AND COATED ARTICLE

BACKGROUND OF THE INVENTION

1. Field of the Invention

This invention relates to new polydiorganosiloxane-containing compositions that are curable with radiation; to a method of preparing a coated substrate using said compositions and to the coated substrate produced thereby.

In particular, this invention relates to certain compositions comprising mercaptoalkyl-containing polydiorganosiloxane and vinylic monomer which, when applied to a substrate such as paper and exposed to energetic radiation such as ultraviolet light, will cure rapidly to produce a coating, adhered to the substrate, that provides controllably variable release of adhesives.

2. Description of the Prior Art

Polyorganosiloxanes have been used for a long time to coat solid substrates, such as paper, to improve the release of adhesive materials therefrom. As the adhesive properties and holding power of adhesive materials have improved, the need for improved release coatings has increased. Improved release coatings have also been required by other factors such as increasing environmental concerns, a desire for faster coating and curing processes, and a need to lower process energy costs.

Solventless, radiation-curable coatings having premium release of aggressive acrylic adhesives have been disclosed by Bokerman, et al. in U.S. Application Ser. No. 663,324, titled "Radiation-Curable Mercaptoalkyl Vinyl Polydiorganosiloxanes", filed on Mar. 3, 1976 and assigned to the assignee of this application. The coatings of Bokerman, et al. are curable with radiation without the aid of a photosensitizer; however, more rapid cure rates are obtained if a photosensitizer, such as benzophenone, is used. Unfortunately, certain photosensitizers are sparingly soluble in mercaptoalkyl-containing polydiorganosiloxanes, and are therefore of limited utility. Solventless, radiation-curable compositions wherein larger, more effective amounts of certain photosensitizers can be dissolved are desirable.

Compositions have also been sought that would provide a controllably variable release of adhesives. Northrup, et al., U.S. Pat. No. 3,328,482, claim an intimate physical mixture of certain polyorganosiloxanes which are curable to an elastomer by a technique that does not use free radicals and a polyisobutylene having a molecular weight of over 400. The compositions of Northrup, et al. are not curable by radiation, but, rather, by the usual moisture-curing processes which are relatively slow or by heat-curing processess which are energy-intensive. Mestetsky, in U.S. Pat. No. 3,770,687 claims a controlled self-release coating composition comprising an organic solvent solution of any wellknown organosiloxane release agent and certain organic polymers. However, the use of organic solvents in coatings is environmentally undesirable. A radiation-curable organosiloxane coating that possesses controllably variable release over a wide range of release values and is free of solvent is also desired.

The reaction of a diorganopolysiloxane with a polymerizable olefin to produce a hydroxyl-terminated grafted polydiorganosiloxane is described by Neuroth in U.S. Pat. No. 3,436,252. The resulting composition, when used to provide release characteristics to paper, requires a curing agent and a solvent and is not radiation-curable.

The reaction of mercaptoalkyl-containing silanes, siloxanes and polysiloxanes with vinylic materials is not new. Cekada, et al. in U.S. Pat. No. 3,532,729 claims a method comprising preparing an emulsion of a siloxane containing at least one percent by weight of units of the general formula

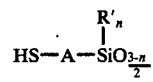

wherein A is an alkylene or arylene radical, R' is a methyl or phenyl radical and $n$ has a value of from 0 to 2 and thereafter adding to the emulsion a non-polymerizable olefin or a polymerizable olefin and causing the addition of the non-polymerizable olefin to the siloxane by free radical catalysis or causing the polymerization of the polymerizable olefin and its addition to the siloxane by free radical catalysis. The emulsions of Cekada, et al. are relatively rich in silsesquioxane and are useful as paint additives when the olefin is acrylate, as molding compositions when the olefin is styrene, as additives to impart thermal stability and as textile treating agents. However, Cekada, et al. do not disclose or suggest a solventless composition comprising a mercaptoalkyl-substituted polydiorganosiloxane and a vinylic monomer that cures to a coating that has controllably variable release of adhesives.

The free-radical polymerization of an organic vinylic monomer, in the presence of a polyorganosiloxane, is disclosed by Saam, U.S. Pat. No. 3,686,356, and by Fiedler, U.S. Pat. No. 3,923,923. However, these compositions which are at least 40 weight percent organic vinylic monomer, have the general characteristics of organic vinylic thermoplastics.

The terms "controlled release" and "controllably variable release" as used herein mean that the force needed to remove adhesive from the surface of the cured compositions of this invention, under the applying, curing and measuring conditions hereinafter described, can be varied, i.e. increased or decreased, in incremental fashion over a wide range of values by controlling the relative amount of vinylic monomer in the composition to be cured.

A coating is considered to provide premium release if a force of not more than 100 grams per inch (38.61 newtons per meter), as measured by the method hereinafter described, is needed to remove the adhesive from the coating. An aggressive adhesive is a material that requires a force of at least approximately 460 newtons/meter (N/m) to remove the adhesive from a stainless steel surface using said method of measuring.

SUMMARY OF THE INVENTION

It is an object of this invention to provide an improved polydiorganosiloxane-containing composition which is curable on exposure to energetic radiation.

It is another object of this invention to provide a method of treating a substrate to provide controlled release of adhesives therefrom.

It is a further object of this invention to provide an article comprising a solid substrate having adhered thereto a cured polyorganosiloxane coating which provides controlled release of ahdesives, such as aggressive acrylic adhesives, applied thereto.

These and other objects. which will be obvious to one skilled in the art after considering the following disclosure and appended claims, are achieved by preparing the radiation-curable polydiorganosiloxane compositions of this invention consisting essentially of a mixture of a triorganosiloxane-endblocked polydiorganosiloxane having silicon-bonded mercaptoalkyl radicals, a vinylic monomer, and, optionally, a methylvinylpolysiloxane, applying said radiation-curable composition to a solid substrate and exposing the applied composition to energetic radiation to provide the article of this invention comprising a substrate having a cured coating adhered thereto that will provide controllably variable release of adhesives.

DESCRIPTION OF THE INVENTION

This invention relates to a radiation-curable composition consisting essentially of a mixture of (A) a triorganosiloxane-endblocked polydiorganosiloxane fluid having a viscosity of at least 0.5 pascal-seconds at 25° C., wherein from 50 to 99 percent of all organic radicals are methyl, from 1 to 5 percent of all organic radicals are mercaptoalkyl having the formula $-(CH_2)_nSH$, wherein $n$ has a value of from 1 to 4 inclusive, any remaining organic radicals in (A) being alkyl radicals having from 2 to 6, inclusive, carbon atoms or phenyl, (B) a methylvinylpolysiloxane compatible with (A) and having an average of at least three vinyl groups per molecule, the amount of (B) being from none to an amount sufficient to provide up to 10.0 silicon-bonded vinyl radicals for every silicon-bonded mercaptoalkyl radical in the composition, and from about 1 to 50 parts by weight for every 100 parts by weight of (A) of (C) a vinylic monomer.

This invention also relates to a method of treating a solid substrate to improve the release of adhesive materials therefrom, said method comprising (I) applying to the substrate the radiation-curable composition obtained by mixing the appropriate amounts of components consisting essentially of (A) and (C) and optionally (B), (II) exposing the applied mixture to energetic radiation and (III) recovering an article comprising the substrate having adhered thereto a cured polydiorganosiloxane that will provide controllably variable release of adhesives therefrom.

Component (A) is any triorganosiloxane-endblocked polydiorganosiloxane of the formula $R_3SiO(R_2SiO)_q$-$SiR_3$ wherein the value of $q$ is such that the viscosity of the polydiorganosiloxane has a value of at least 500 centipoise (0.5 pascal-seconds) at 25° C. Each R radical may be, independently, an alkyl radical of from 1 to 6 carbon atoms, such as methyl, ethyl, isopropyl, butyl, pentyl, hexyl, and cyclohexyl; or a phenyl radical or a mercaptoalkyl radical. Suitable mercaptoalkyl radicals have the formula $-(CH_2)_nSH$, wherein $n$ has a value of from 1 to 4, such as $-CH_2SH$, $-CH_2CH_2SH$, $-CH_2CH_2CH_2SH$ and $-CH_2CH_2CH_2CH_2SH$. Mercaptopropyl radicals are preferred because of synthesis, stability and odor considerations. From 50 to 99 percent of all R radicals are the methyl radical. It is preferred that each silicon atom in (A) have at least one silicon-bonded methyl radical. From 0 to 5 percent of all R radicals are the phenyl radical. Preferably the number of phenyl radicals is as small as possible, for example as endblocking radicals, since the cure rate of radiation-curable compositions is retarded by the presence of silicon-bonded phenyl radicals. From 1 to 5 percent of all R radicals are mercaptoalkyl radicals. Mercaptoalkyl radicals may be bonded to any of the silicon atoms in (A) but it is preferred that a majority of mercaptoalkyl radicals are non-terminal, i.e. are bonded to non-terminal silicon atoms.

Polydiorganosiloxanes that are preferred as component (A) therefore have two methyldiorganosiloxane endblocking units per molecule, such as $(CH_3)_3SiO_{1/2}$, $(CH_3)_2(HSCH_2CH_2CH_2)SiO_{1/2}$ and $C_6H_5(CH_3)_2SiO_{1/2}$, methylorganosiloxane units, such as $(CH_3)_2SiO$, $CH_3(C_6H_5)SiO$, and $CH_3(CH_3CH_2)SiO$ and methylmercaptoalkylsiloxane units, such as $CH_3(HSCH_2CH_2)SiO$ and $CH_3(HSCH_2CH_2CH_2)SiO$. A polydiorganosiloxane consisting essentially of $(CH_3)_3SiO_{1/2}$ units, $(CH_3)_2SiO$ units and $CH_3(HSCH_2CH_2CH_2)SiO$ units is highly preferred. While polydiorganosiloxane (A) is described as consisting of triorganosiloxane units and diorganosiloxane units, it is to be understood that there can be in (A) small amounts of $RSiO_{3/2}$ units that are normally present as impurity units in commercial polydiorganosiloxanes.

The viscosity of component (A) should have a value of at least 0.5 pascal-seconds (Pa·s) at 25° C. so that a mixture of the desired amounts of (A), (B) and (C) will have a viscosity such that the mixture can be conveniently applied to a substrate and cured. There is no known upper limit for the value of the viscosity of (A); however, the viscosity of the mixture of (A), (B) and (C) should be sufficiently low so that said mixture can be readily applied to the substrate. For general applications a practical upper limit for the viscosity of the mixture of (A), (B) and (C) is approximately 100 Pa·s. For paper coating applications, a preferred upper limit for the viscosity of a mixture of (A), (B) and (C) is approximately 10 Pa·s. If the viscosity of the mixture of (A), (B) and (C) is undesirably high, any common volatile organic solvent, such as benzene, toluene, methylene chloride or cyclohexane can be admixed with the mixture to reduce the viscosity of the mixture of (A), (B) and (C) to a value of no more than 100 Pa·s at 25° C., preferably no more than 10 Pa·s at 25° C. for paper coating applications. Preferably component (A) has a viscosity of from 0.5 to 100 Pa·s at 25° C. for general applications and a viscosity of from 0.5 to 10 Pa·s at 25° C. for paper coating applications.

Component (A) may be prepared by any suitable method that can be used for the preparation of triorganosiloxane-endblocked polydiorganosiloxane bearing mercaptoalkyl radicals. For example, in one method a silane bearing silicon-bonded hydrolyzable radicals and at least one mercaptoalkyl radical, such as $(HSCH_2CH_2CH_2)(CH_3)Si(OCH_3)_2$ is hydrolyzed and condensed to prepare a mixture of cyclic and silanolendblocked polyorganomercaptoalkylsiloxanes which is then mixed with an appropriate amount of a suitable diorganocyclopolysiloxane such as dimethylcyclopolysiloxane, an appropriate amount of a suitable endblocking source such as a triorganosiloxaneendblocked siloxane such as decamethyltetrasiloxane and hexamethyldisiloxane and an acid catalyst such as $CF_3SO_3H$ and heated for from 3 to 8 hours. Alternately, a mercapto—alkyl-containing cyclopolysiloxane such as $\{(HSCH_2CH_2CH_2)-(CH_3)SiO\}_x$ may be used in place of the polyorganomercapto—alkylsiloxane mixture in the method recited above. Other methods for preparing component (A) will be obvious to one skilled in the silicone polymer art.

Component (B) is any methylvinylpolysiloxane which is compatible with component (A) and which has at least three silicon-bonded vinyl radicals per molecule. By the term methylvinylpolysiloxane it is meant that essentially all of the siloxane units of (B) are methylvinylsiloxane units. Of course, it should be understood that component (B) may have minor amounts of other siloxane units such as diorganosiloxane units such as $(CH_3)_2SiO$; triorganosiloxane endblocking units, such as $(CH_3)_3SiO_{1/2}$ and $(C_6H_5)(CH_3)(CH_2=CH)-SiO_{1/2}$; organosiloxane units such as $CH_3SiO_{3/2}$ and $CH_2=CHSiO_{3/2}$ and hydroxysiloxane units such as hydroxydiorganosiloxane units such as $(HO)(CH_3)(CH_2=CH)SiO_{1/2}$ and $(HO)(CH_3)_2SiO_{1/2}$ without departing from the spirit of this invention. Component (B) may be cyclic, linear or branched as long as it is compatible with (A). For example, component (B) may be a methylvinylcyclopolysiloxane or a hydroxyendblocked methylvinylpolysiloxane such as $HO\{CH_3(CH_2=CH)SiO\}_xH$ or a triorganosiloxane-endblocked methylvinylpolysiloxane such as $(CH_3)_3SiO\{CH_3(CH_2=CH)SiO\}_xSi(CH_3)_3$ and $(CH_3)_3SiO\{CH_3(CH_2=CH)SiO\}_x Si(CH_3)_2(CH=CH_2)$. Furthermore, component (B) may be a single methylvinylpolysiloxane or a mixture of methylvinylpolysiloxanes such as a mixture of linear and cyclic methylvinylpolysiloxanes. Component (B) is preferably a methylvinylcyclopolysiloxane having from 3 to 10 silicon atoms per molecule. Furthermore, the methylvinylcyclopolysiloxane may be a single methylvinylcyclopolysiloxane, such as a methylvinylcyclotetrasiloxane or it may be a mixture of two or more methylvinylcyclopolysiloxanes. Most preferably, component (B) has the formula $\{CH_3(CH_2=CH)SiO\}_z$, hereinabove $z$ has a value of from 3 to 10 inclusive.

Methylvinylpolysiloxanes are well known in the organosilicon art. They can be prepared by any suitable method for the preparation of diorganopolysiloxanes. One convenient method to prepare a suitable methylvinylpolysiloxane is to hydrolyze methylvinyldichlorosilane and distill the volatile methylvinylcyclopolysiloxanes. The addition of suitable endblocking species such as trimethylchlorosilane to the hydrolysis mixture will result in endblocked linear poly(methylvinylsiloxanes) which may also be distilled.

Component (C) is at least one vinyl monomer. For the purposes of this invention, vinylic monomer (C) may be monofunctional, i.e. having one vinyl group per molecule, or multifunctional, i.e. having more than one vinyl group per molecule. Vinylic monomers are well known in organic chemistry and are conveniently grouped into categories. One category of vinylic monomers is the styrene class. Any suitable styrene-class monomer may be used in the compositions of this invention such as styrene, alpha-methylstyrene, vinyl toluene, divinylbenzene, halogenated styrenes such as 2-chlorostyrene and 2,5-dichlorostyrene and oxygenated styrenes such as 4-ethoxystyrene. Another category of vinylic monomers is the acrylate class. Any suitable acrylate-class monomer may be used in the compositions of this invention such as acrylamide, acrylonitrile, methyl acrylate, methyl methacrylate, ethyl acrylate, 2-ethylhexyl acrylate, 1,6-hexanediol diacrylate, neopentylglycol diacrylate, trimethylolpropane triacrylate, cyclohexyl acrylate, glycidyl methacrylate and 2-methoxyethyl methacrylate. Other vinylic monomers that are useful in the compositions of this invention are the members of the active olefin class such as 1,4-butadiene, vinyl acetate, allyl ethyl ether, methyl vinyl ketone, vinyl pyridine, allyl benzoate and vinyl methyl sulfide.

To be useful in the compositions of this invention at least the desired amount of the admixed vinylic monomer must be compatible with and remain in the composition until the composition is cured. In the event that a portion of the admixed vinylic monomer will be lost, for example by evaporation, before the composition is cured, vinylic monomer in sufficient excess of the desired amount may be admixed. The most convenient way to prevent the loss of vinylic monomers by evaporation is to select monomers which have boiling points, at atmospheric pressure, that are greater than ambient temperatures, such as greater than room temperature and preferably greater than 50° C.; however, if the composition can be applied and cured under suitable conditions, such as at reduced temperature, lower boiling vinylic monomers may be used if desired.

Preferred vinylic monomers are the styrene-class and acrylate-class vinylic monomers. It is to be understood that component (C) may be a single vinylic monomer or a mixture of two or more vinylic monomers.

A highly-preferred styrene-class monomer is divinylbenzene. The word divinylbenzene is meant to include a single isomer, such as para-divinylbenzene or a mixture of two or more isomers such as a mixture of ortho, meta and para isomers, or other mixtures, many of which are commercially available from many sources in varying grades, such as 20–25%, 50–60% and 97% divinylbenzene, and which contain the three isomeric forms of divinylbenzene together with ethylvinylbenzene and diethylbenzene. However, only the vinyl-containing portions of such mixtures are regarded as a vinylic monomer. Divinylbenzene is highly preferred in the compositions of this invention because it provides uniform control of adhesive release in the cured compositions of this invention.

A highly-preferred acrylate-class monomer is 2-ethylhexyl acrylate (EHA). EHA is very soluble in mercaptoalkyl-containing polydiorganosiloxane and therefore can be used as a reactive diluent. EHA is especially useful because it serves to increase the solubility of other acrylate monomers and certain photosensitizers in the mercaptoalkyl-containing polydiorganosiloxane. For example, trimethylolpropane triacrylate, which is essentially insoluble in mercaptopropyl-substituted polydiorganosiloxane fluid, can be admixed in the compositions of this invention in an amount of up to 3 parts by weight, per 100 parts by weight of acrylate monomer plus polydiorganosiloxane fluid, when 5 parts of 2-ethylhexyl acrylate is admixed.

The compositions of this invention are prepared by mixing the triorganosiloxane-endblocked polydiorganosiloxane (A) with the desired amount of the methylvinylpolysiloxane (B) and vinylic monomer (C) in any suitable manner such as blending, stirring, milling and tumbling. Although not required, the use of solvents and/or heat to aid this mixing process is possible. Any solvents that are used in the mixing process may be removed before or after the compositions of this invention are applied to a substrate.

An appropriate amount of component (B) that is to be mixed in the compositions of this invention is an amount such that there are from 0 to 10.0 silicon-bonded vinyl radicals in (B) for every silicon-bonded mercaptoalkyl radical in component (A). Thus, the compositions of this invention are useful when component (B) is present or not present. While not wishing to be limited by theory, we believe that the curing of the composition that is free of (B) proceeds through the reaction of mercaptoalkyl groups, either with other mercaptoalkyl groups or with vinylic monomer or with both. The compositions of this invention are also curable when there is sufficient methylvinylpolysiloxane present to provide up to 10.0 preferably up to 4.0 and most preferably up to 1.0, such as from 0.2 to 1.0 silicon-bonded vinyl radicals in (B) for every silicon-bonded mercaptoalkyl radical in (A).

The vinylic monomer (C) may be used in the compositions of this invention in widely varying quantities. Thus, amounts of vinylic monomer as small as about 1 part by weight for every 100 parts by weight of the mercaptoalkyl-containing polydiorganosiloxane (A) have been found to be effective in the compositions of this invention, such as for improving the cure rate of the compositions. Larger amounts of vinylic monomer, for example 3, 5, 10, 20, 50, and more parts by weight for every 100 parts by weight of component (A), are effective in the compositions of this invention, such as for controllably varying the release force needed to remove adhesive materials from the surface of the cured composition or to permit the use of more effective photosensitizers or more effective amounts of photosensitizers which are sparingly soluble in component (A). Compositions wherein the vinylic monomer is present in amounts ranging from about 1 to about 50 parts by weight for every 100 parts by weight of (A) are preferred for providing desired levels of release of adhesives.

The compositions of this invention may also contain ingredients that are common to radiation-curable compositions such as photosensitizers and gelation inhibitors. An effective amount of said ingredients may be determined by simple experimentation.

A radiation-curable composition is more useful if it does not cure or gel at room temperature for a period of at least 8 hours, preferably for at least 24 hours, after being prepared. It may be desired to assure that no gelation occurs over a period of weeks or months. To this end a gelation inhibitor may be admixed with the compositions of this invention at any time prior to curing or gelation of the composition. Any suitable gelation inhibitor may be used in the compositions of this invention, but the best inhibitors known to the inventors at this time are dihydric phenols and their alkylated derivatives. More particularly, the inhibitors are pyrocatechol or hydroquinone or monoethers thereof or alkyl-substituted hydroquinone or pyrocatechol or monoethers thereof. These materials are described in "Stabilization of Polymers and Stabilizer Processes," a publication of the American Chemical Society, 1969. These inhibitors are effective in concentrations as low as approximately 50 parts per million parts of (A) plus (B) plus (C), on a weight basis.

To increase the rate of cure of the compositions of this invention under the action of ultraviolet light, and thus decrease the minimum cure time, it is desirable to use an effective amount of a photosensitizer. Any suitable photosensitizer may be used such as the well-known aromatic ketones such as acetophenone, benzophenone, dibenzosuberone and benzoin ethyl ether and azo compounds such as azobisisobutyronitrile. Any suitable photosensitizer may be admixed with the compositions of this invention at any time prior to the curing of said compositions. These photosensitizers are effective in concentrations as low as approximately 500 parts by weight for every one million parts by weight of (A) plus (B) plus (C).

Not all photosensitizers gave rapid cure rates in concentrations as low as 500 parts per million. Furthermore, certain of these photosensitizers do not have sufficient solubility in mercaptoalkyl-containing polydiorganosiloxane fluids to permit their use in concentrations high enough to facilitate a rapid cure rate (for example a cure time of less than 5 seconds) of the compositions in the presence of ultraviolet light. The compositions of this invention, however, permit the use of higher concentrations of photosensitizers because of the solubilizing effect of the vinylic monomer.

In addition to increasing the cure rate of the compositions of this invention, photosensitizing compounds, such as benzophenone, also alter the surface characteristics, such as the release of adhesives, of the cured compositions when said compounds are used in higher concentrations, such as 3 to 5 percent by weight, based on the weight of the composition. It is to be understood that the compositions of this invention provide controllably variable release of adhesives by permitting the use of increased amounts of photosensitizing compounds as well as by varying the amount and type of vinylic monomer that is used.

The compositions of this invention may contain other non-essential ingredients such as pigments and rheology control additives which will not interfere significantly with the radiation cure of the composition.

The compositions of this invention are useful as radiation-curable release coatings, paint additives, coil coatings, textile treatments, water-repellant coatings, inks and the like.

The compositions of this invention may be applied and cured to any suitable solid substrate such as cellulosic materials such as paper and wood; metals such as aluminum, iron and steel; plastics such as polyethylene or polypropylene films or sheets, polyethylene or polypropylene films on other surfaces such as on paper, polyamides such as nylon and polyesters such as Mylar ®, (registered trademark of E. I. DuPont de Nemours, Wilmington, Delaware); and siliceous materials such as ceramics, glass and concrete.

The compositions of this invention are particularly useful as release coatings for paper. Said compositions may be applied in a thin layer to the surface of paper to provide a coating with a mass of approximately one gram per square meter of coated paper. In the cured form these thin coatings will release adhesives, such as aggressive acrylic adhesives, with a force that varies with the amount of organic vinylic monomer that is used. It is to be understood that said coatings may also be applied in thinner or thicker layers as long as the radiation cure of the coating is not impaired. In the paper release coating art the amount of release coating will generally vary from approximately 0.1 to 2.0 grams per square meter.

In the method of this invention the compositions of this invention are applied to a substrate by any suitable method such as brushing, dipping, spraying, rolling and spreading. Application of said compositions to paper may be done by any of the suitable methods that are well known in the paper coatings art such as by a trailing blade coater, by an air knife, by kiss rolls, by gravure rolls, by printing or by any other known method. The compositions of this invention may be applied to the entire surface of a substrate or to any portion thereof, as desired. After the composition has been applied it is preferred to remove any solvents that may be present in the applied composition. Preferably no solvent is used in the preparation of the composition or in the application of said composition to the substrate.

The compositions of the present invention are particularly useful because no solvent is required for preparing or applying said compositions to a substrate. Since the vinylic monomer (C) may act as a reactive diluent, as a solvent, and/or as a surface modifier, such as a modifier of adhesive release, the compositions of this invention have wide utility.

The applied composition of this invention is cured by exposing at least a portion thereof to energetic radiation for a length of time sufficient to cure the exposed composition and to adhere the exposed composition to the substrate. The cured state of the composition is determined by the Scotch ® (registered trademark of 3M Company, Minneapolis, Minnesota) tape test hereinafter described. To be effective as a release coating on a solid substrate the applied, cured compositions of this invention must adhere to the substrate with an adhesive force that is greater than the adhesive force between the cured composition and the adhesive to be released. Preferably the applied, cured composition should pass the rub-off test, hereinafer described. It should be understood that the entire applied composition can be exposed to radiation and cured or only a portion thereof may be exposed and cured and any uncured composition subsequently removed, as desired.

Energetic radiation, for the purposes of this invention, is radiation selected from the group consisting of actinic radiation such as ultraviolet light, X-rays and gamma rays and particulate radiation such as alpha particles and electron beams. The length of time that the compositions of this invention should be exposed to the energetic radiation, in order to cure said composition and to adhere it to the substrate, will depend upon the energy of the radiation and the intensity of the radiation that is incident on the composition. Furthermore, the effectiveness of incident radiation is dependent upon several factors. For example, it is known that low energy electron beams are more effective in an inert atmosphere such as nitrogen, than in air. Of course, it is well known that the intensity of the incident radiation is also inversly proportional to the distance between the energy source and the composition. Whatever form of energetic radiation is used in the method of this invention, the compositions of this invention are exposed to it for a length of time sufficient to cure the composition and to adhere it to the substrate.

Utraviolet light is a preferred form of energetic radiation for curing the compositions of this invention because of its relative safety, lower cost and lower power requirements. Ultraviolet light that contains radiation having a wave length of from approximately 200 to 400 nanometers is highly preferred.

The compositions of this invention and the method of this invention uniquely provide for the preparation of articles comprising a substrate having adhered to at least a portion of its surface a cured polydiorganosiloxane coating that will release adhesives, such as aggressive acrylic adhesive, with a force that is controllably variable.

The best way to practice this invention is detailed in the following examples which are provided to further exemplify the invention and are not to be construed as limiting the invention which is properly delineated by the appended claims. All parts are parts by weight and all viscosities are at 25° C. All release data were measured in grams per inch and converted to N/m for this application by multiplying by 0.3860886 and rounding off.

EXAMPLE 1

A three-necked resin kettle fitted with a mechanical stirrer, reflux condenser and addition funnel was charged with 43.5 parts of $HO\{CH_3(HSCH_2CH_2CH_2)SiO)\}_xH$ and 4 parts of hexamethyldisiloxane. The stirred mixture was heated to 70–80° C., 0.25 parts of $CF_3SO_3H$ was added to the warm mixture and heating was continued at 70–80° C. for an additional 30 minutes. Over a period of one hour, 456.5 parts of dimethylcyclopolysiloxane was added to the resin kettle and the reaction temperature was maintained at 80°–90° C. Water, 0.03 parts, was then added and the mixture was heated for 5.5 hours at about 80° C. The $CF_3SO_3H$ was neutralized with 2.5 parts of $Na_2CO_3$ and stirring was continued at 80° C. for an additional 1 hour. The mixture was filtered and stripped at 150° C. and less than 5 mm. of mercury pressure (667 pascal). The nonvolatile fluid had a viscosity of 1.62 pascal-seconds and consisted of 0.78 mole percent $(CH_3)_3SiO_{1/2}$ units, 94.26 mole percent $(CH_3)_2SiO$ units and 4.96 mole percent $CH_3(HSCH_2CH_2CH_2)SiO$ units. Thus, the silicon-bonded organic radicals of the non-volatile fluid consisted of 2.47 percent $HSCH_2CH_2CH_2$— radicals and 97.53 percent $CH_3$— radicals. Several silicone polymers having various viscosities and consisting of approximately 5 mole percent of $CH_3(HSCH_2CH_2CH_2)SiO$ units and 95 mole percent of $(CH_3)_2SiO$ units and being endblocked with $(CH_3)_3SiO_{1/2}$ units were prepared by this method by varying the relative amount of hexamethyldisiloxane that was used.

EXAMPLE 2

A silicone polymer prepared by the method of Example 1 and having a viscosity of 1.39 Pa·s was mixed with 55%-divinylbenzene (55% grade divinylbenzene is commercially available and is 55% divinylbenzene isomers and 45% ethylstyrene isomers and diethylbenzene isomers) to prepare a mixture containing the amount of 55% divinylbenzene indicated in Table I. For every 100 grams of polymer plus 55% divinylbenzene there was present 1.5 grams of benzophenone as a photosensitizer and 25 microliters of p-methoxyphenol as a gellation inhibitor.

Each formulation was coated onto 40 pound supercalendared Kraft paper using a blade coater to give approximately 0.7 pounds of coating per 3000 square feet of paper surface (1.1 g/m²). The coating was exposed at a distance of approximately 80 mm for 1.6 seconds to two 20 inch (0.51 m) Hanovia medium pressure lamps having an input of 200 watts/inch (7.8 kW/m), an output of 1.4 kW/m in the ultraviolet and a U.V. maximum at 366 nm. The coating was considered to be cured if the adhesive surface of a piece of Scotch ® tape would stick to itself after having first been adhered to the coating and then removed and doubled back on itself. The adhesion of each cured formulation to the paper was determined by rubbing the cured coating with the index finger. Adhesion was deemed preferred if no rub-off occurred.

Each cured formulation was prepared for release testing according to the following procedure. After being aged overnight at room temperature the cured coating was coated with adhesive using a solution of Monsanto ® GMS-263 acrylic adhesive or National Starch's SBR 36-6045 adhesive. The adhesive solutions were applied to the cured coating at a wet thickness of 3 mils (76.2μ m) using a Bird Bar. The applied adhesives were air-dried at room temperature for 1 minute, heated at 65° C. for one minute and then cooled to room temperature again for 1 minute. A sheet of 60 pound Matte Litho was applied to the dried adhesive and the resulting laminate was pressed through two rolls of an off-set printer and aged for 20 hours at 70° C.

Release testing of the laminates was accomplished by cooling the aged laminates to room temperature, cutting the cooled laminates into 1 inch (25.4 mm) strips and pulling the Matte/adhesive lamina from the Kraft paper/coating lamina at an angle of 180° ($\pi$ radians) at 400 inches/minute (0.17 m/s). The force, in grams per inch, that was required to separate the laminae was noted. A composition that results in a release value of no more than 38.61N/m using this test is considered to display premium release.

Table I summarizes the release values (converted from grams/inch to newtons/meter) that were obtained for the several cured formulations. Note that the release force of GMS-263 acrylic adhesive is directly related to the amount of divinylbenzene in the composition.

TABLE I

| 55% Divinylbenzene (weight percent) | Vinyl radicals (per SH radical) | Adhesive Release (N/m) GMS-263 | SBR 36-6045 |
|---|---|---|---|
| 13.1 | 2.0 | 38.6 | 52.1 |
| 23.4 | 4.6 | 52.1 | 115.8 |
| 37.7 | 8.0 | 67.6 | 96.5 |
| 54.6 | 16.1 | 115.8 | Tore |
| 70.7 | 32.2 | High and Irregular | 154.4 |

EXAMPLE 3

A silicone polymer, 96.4 parts, prepared by the method of Example 1 and having a viscosity of 1.62 Pa·s was mixed with a mixture of 3.6 parts of divinylbenzene (55% grade) and 1.5 parts of the photosensitizer listed in Table II. Each composition was coated onto paper, cured with ultraviolet light and tested for release of GMS-263 adhesive as described in Example 2. The cure time of a composition is the calculated interval that the coated paper is exposed to ultraviolet light as it is passed under a 16 inch exposure opening at varying speeds. For example, a paper speed of 50 feet per minute results in an exposure of 1.6 seconds. The minimum cure time is the shortest exposure that will produce a cured composition as measured by the Scotch ® tape test described in Example 2. Note that premium release is displayed by these formulations except the formulation sensitized with benzoin isopropyl ether.

TABLE II

| Photosensitizer | Minimum Cure Time (seconds) | GMS-263 Acrylic Adhesive Release (N/m) |
|---|---|---|
| None | 2.7 | 30.89 |
| Benzophenone | 1.6 | 25.10 |
| Desyl Bromide | 1.1 | 30.89 |
| Benzoin Methyl Ether | 1.1 | 32.82 |
| Benzoin Ethyl Ether | 1.1 | 32.82 |
| Dibenzosuberone | 1.1 | 34.75 |
| Benzoin Isopropyl Ether | 1.1 | 40.54 |

EXAMPLE 4

A mixture of 98 parts of the silicone polymer of Example 3, 2 parts of divinylbenzene (97% grade) and 1.5 parts of benzophenone was prepared and cured on paper as in Example 2. After aging, the coated paper released GMS-263 acrylic adhesive with a force of 32.82 N/m.

EXAMPLE 5

One hundred parts of a mixture of the silicone polymer of Example 3 and one of the the following polymerizable olefins was mixed with 1.5 parts of benzophenone and the resulting compositions were coated onto Kraft paper and cured with ultraviolet light. A mixture having 3.6 percent by weight divinylbenzene (55% grade) had a minimum cure time of 1.6 seconds. A mixture having 3.2 percent by weight styrene had a minimum cure time of 1.1 seconds. A mixture having 1.6 percent by weight styrene and 1.6 percent by weight divinylbenzene (55% grade) had a minumum cure time of 0.9 seconds. All three cured coatings displayed premium release of aggressive acrylic adhesives after aging for 24 hours at 70° C.

EXAMPLE 6

A silicone polymer prepared by the method of Example 1 and having a viscosity of 1.88 Pa·s was used to prepare compositions consisting of 97 parts of polymer, 3 parts of $\{CH_3(CH_2\!=\!CH)SiO\}_{4-10}$ and either 1.55 parts of benzophenone and 3 parts of 1,6-hexanediol diacrylate or 1.62 parts of benzophenone and 6 parts of 1,6-hexanediol diacrylate. The compositions were applied to Kraft paper, cured, aged and tested as in Example 2. Table III summarizes the controllably variable release data for these compositions and, for comparison, a composition that contains only polymer and benzophenone and a composition that contains polymer, benzophenone and methylvinylcyclopolysiloxane. Controllably-variable release is evident.

TABLE III

| Methylvinyl cyclopolysiloxane (Parts) | 1,6-Hexanediol diacrylate (Parts) | Benzophenone (Parts) | Adhesive Release GMS-263 (N/m) |
|---|---|---|---|
| — | — | 1.50 | 23.2 |
| 3 | — | 1.50 | 27.0 |
| 3 | 3 | 1.55 | 36.7 |
| 3 | 6 | 1.62 | 52.1 |

EXAMPLE 7

A silicone polymer prepared by the method of Example 1 and having a viscosity of 1.23 Pa·s was mixed with varying amounts of acrylate monomers. The mixtures were mixed with benzophenone and coated onto Kraft paper and cured with ultraviolet light as in Example 2. Table IV lists the amount and type of acrylate monomer that was used in each composition. Note that the composition having no acrylate monomer cures to a coating that has the lowest release value for either adhesive and higher release values are available with composition comprising monoacrylate monomers and/or multiacrylate monomers.

TABLE IV

| Acrylate Monomer[1] (Parts[2]) | | | | Benzophenone | Adhesive Release (N/m) | |
|---|---|---|---|---|---|---|
| EHA | HDDA | NPGDA | TMPTA | (Parts[2]) | GMS-263 | SBR 36-6045 |
| — | — | — | — | 1.5[3] | 23.2 | 15.4 |
| — | — | — | — | 1.5[4] [3] | 27.0 | 21.2 |
| 5 | — | — | — | 1.5 | 38.6 | 42.5 |
| 10 | — | — | — | 3.0 | 36.7 | 32.8 |
| 10 | — | — | — | 5.0 | 44.4 | 57.9 |
| 5 | 3 | — | — | 1.5 | 36.7 | 46.3 |
| 5 | 6 | — | — | 1.5 | 46.3 | 44.4 |
| 5 | 8 | — | — | 1.5 | 44.4 | 46.3 |
| 10 | 5 | — | — | 3.0 | 44.4 | 50.2 |
| 14 | 1 | — | — | 5.0 | 95.8 | 70.7 |
| 17 | 3 | — | — | 5.0 | 79.2 | 59.8 |
| — | — | 3 | — | 1.5 | 44.4 | 27.0 |
| 5 | — | 3 | — | 1.5 | 46.3 | 32.8 |
| 5 | — | 6 | — | 1.5 | 44.4 | 32.8 |
| 5 | — | 6 | — | 3.0[5] | 78.4 | 57.9 |
| 5 | — | 8 | — | 1.5 | 44.4 | 46.3 |
| 5 | — | — | 1 | 1.5 | 32.8 | 30.9 |
| 5 | — | — | 2 | 1.5 | 30.9 | 30.9 |
| 5 | — | — | 3 | 1.5 | 27.0 | 21.2 |
| 5 | — | — | 3 | 3.0 | 34.8 | 36.7 |

[1]EHA = 2-ethylhexylacrylate; HDDA = 1,6-hexanediol diacrylate; NPGDA = neopentylglycol diacrylate; TMPTA = trimethylolpropanetriacrylate.
[2]Parts per hundred parts of polymer plus acrylate monomer when 1.5 parts of benzophenone is used; otherwise parts per hundred of polymer plus acrylate monomer plus benzophenone.
[3]For comparison purposes only.
[4]Composition contains 3 parts of $\{CH_3(CH_2=CH)SiO\}_{4-10}$
[5]Also contains 3 parts of dibutylaminoethanol.

That which is claimed is:

1. A radiation-curable composition consisting essentially of a mixture of
   A. a triorganosiloxane-endblocked polydiorganosiloxane fluid having a viscosity of at least 0.5 pascal-seconds at 25° C., wherein from 50 to 99 percent of all organic radicals are methyl, from 1 to 5 percent of all organic radicals are mercaptoalkyl having the formula $-(CH_2)_nSH$, wherein $n$ has a value of from 1 to 4 inclusive, any remaining organic radicals in (A) being alkyl radicals having from 2 to 6, inclusive, carbon atoms or phenyl,
   B. a methylvinylpolysiloxane, compatible with (A) and having an average of at least three vinyl groups per molecule, the amount of (B) being from none to an amount sufficient to provide up to 10.0 silicon-bonded vinyl radicals for every silicon-bonded mercaptoalkyl radical in the composition, and from about 1 to 50 parts by weight for every 100 parts by weight of (A) of
   C. a vinylic monomer.

2. The composition of claim 1 containing up to 5 weight percent, based on the weight of the composition, of a photosensitizing compound.

3. The composition of claim 2 wherein the vinylic monomer is a styrene-class vinylic monomer and $n$ has a value of 3.

4. The composition of claim 3 wherein the vinylic monomer comprises divinylbenzene and the polydiorganosiloxane (A) consists essentially of $(CH_3)_3SiO_{1/2}$ siloxane units, $(CH_3)_2SiO$ siloxane units and $CH_3(HSCH_2CH_2CH_2)SiO$ siloxane units.

5. The composition of claim 2 wherein the vinylic monomer is an acrylate-class vinylic monomer and $n$ has a value of 3.

6. The composition of claim 5 wherein the vinylic monomer comprises 2-ethylhexyl acrylate and the polydiorganosiloxane (A) consists essentially of $(CH_3)_3SiO_{1/2}$ siloxane units, $(CH_3)_2SiO$ siloxane units and $CH_3(HSCH_2CH_2CH_2)SiO$ siloxane units.

7. The composition of claim 5 wherein the methylvinylpolysiloxane has the formula $\{CH_3(CH_2=CH)SiO\}_z$ where $z$ has a value of from 3 to 10 inclusive and said methylvinylpolysiloxane is present in an amount sufficient to provide from 0.2 to 1.0 silicon-bonded vinyl radicals for every silicon-bonded mercaptopropyl radical in the composition, the vinylic monomer is 1,6-hexanediol diacrylate and the polydiorganosiloxane (A) consists essentially of $(CH_3)_3SiO_{1/2}$ siloxane units, $(CH_3)_2SiO$ siloxane units and $CH_3(HSCH_2CH_2CH_2)SiO$ siloxane units.

8. A method for treating a solid substrate to improve the release of adhesive materials therefrom, said method comprising
   I. applying to the solid substrate a composition obtained by mixing components consisting essentially of
      A. a triorganosiloxane-endblocked polydiorganosiloxane fluid having a viscosity of at least 0.5 pascal-seconds at 25° C., wherein from 50 to 99 percent of all organic radicals are methyl, from 1 to 5 percent of all organic radicals are mercaptoalkyl having the formula $-(CH_2)_nSH$, wherein $n$ has a value of from 1 to 4 inclusive, any remaining organic radicals in (A) being alkyl radicals having from 2 to 6, inclusive, carbon atoms and phenyl,
      B. A methylvinylpolysiloxane, compatible with (A) and having an average of at least three vinyl groups per molecule, the amount of (B) being from none to an amount sufficient to provide up to 10.0 silicon-bonded vinyl radicals for every silicon-bonded mercaptoalkyl radical in the composition, and from about 1 to 50 parts by weight for every 100 parts by weight of (A) of
      C. a vinylic monomer,
   II. exposing the applied composition to energetic radiation, and
   III. recovering an article comprising the solid substrate having adhered thereto a cured polydiorganosiloxane that will provide controllably variable release of adhesives therefrom.

9. The method of claim 8 wherein the composition further consists of up to 5 weight percent based on the weight of the composition, of a photosensitizing compound and the applied composition is exposed to radiation having a wavelength of from 200 to 400 nanometers.

10. The method of claim 9 wherein the triorganosiloxane-endblocked polydiorganosiloxane consists essentially of $(CH_3)_3SiO_{1/2}$ siloxane units, $(CH_3)_2SiO$ siloxane units and $CH_3(HSCH_2CH_2CH_2)SiO$ siloxane units and the methylvinylpolysiloxane has the formula $\{CH_3(CH_2=CH)SiO\}_z$, wherein $z$ has a value of from 3 to 10 inclusive.

11. The method of claim 10 wherein the vinylic monomer is a styrene-class vinylic monomer and comprises divinylbenzene.

12. The method of claim 10 wherein the vinylic monomer is an acrylate-class vinylic monomer and comprises 2-ethylhexyl acrylate.

13. The method of claim 10 wherein the methylvinylpolysiloxane is present in an amount sufficient to provide from 0.2 to 1.0 silicon-bonded vinyl radicals for every silicon-bonded mercaptopropyl radical in the composition and the vinylic monomer is 1,6-hexanediol diacrylate.

14. The article produced by the method of claim 11.

15. The article produced by the method of claim 12.

16. The article produced by the method of claim 13.

17. An article comprising a solid substrate having adhered to at least a portion thereof the cured composition of claim 1.

18. The article of claim 17 wherein the solid substrate is paper.

* * * * *

UNITED STATES PATENT AND TRADEMARK OFFICE
CERTIFICATE OF CORRECTION

PATENT NO. : 4,070,526
DATED : January 24, 1978
INVENTOR(S) : Joseph A. Colquhoun, Robert E. Kalinowski It is certified that error appears in the above-identified patent and that said Letters Patent are hereby corrected as shown below:

Column 1, line 59, "wellknown" should read --well-known--.

Column 7, line 18, "compositions" should read --composition--.

Column 8, line 3, "gave" should read --give--.

Column 10, lines 9 and 10, the formula should read
$$--HO\{CH_3(HSCH_2CH_2CH_2)SiO\}_uH--.$$

Column 13, Table IV, line 21, after the word "hundred" insert the word --parts--.

Signed and Sealed this

Fourth Day of November 1980

[SEAL]

Attest:

SIDNEY A. DIAMOND

Attesting Officer

Commissioner of Patents and Trademarks